(12) United States Patent
Jacobson

(10) Patent No.: US 6,915,518 B1
(45) Date of Patent: Jul. 5, 2005

(54) SYSTEM AND METHOD FOR RUNTIME REALLOCATION OF PLD RESOURCES

(75) Inventor: Neil G. Jacobson, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 709 days.

(21) Appl. No.: 09/626,300

(22) Filed: Jul. 24, 2000

(51) Int. Cl.[7] .................................................. G06G 9/46
(52) U.S. Cl. ........................ 718/104; 718/100; 718/105; 710/8; 710/15; 710/104
(58) Field of Search ............................ 710/8, 15, 104; 709/100, 104, 105, 223, 238, 226; 718/100, 104, 105

(56) References Cited

U.S. PATENT DOCUMENTS

| | | | | |
|---|---|---|---|---|
| 4,002,909 A | * | 1/1977 | Packard et al. ............. 250/328 |
| 5,027,348 A | * | 6/1991 | Curry, Jr. .................... 370/445 |
| 5,109,353 A | * | 4/1992 | Sample et al. ................ 716/17 |
| 5,128,871 A | * | 7/1992 | Schmitz ........................ 716/17 |
| 5,361,373 A | * | 11/1994 | Gilson ............................ 712/1 |
| 5,583,995 A | * | 12/1996 | Gardner et al. ............. 709/219 |
| 5,589,782 A | * | 12/1996 | Sharpe-Geisler ............. 326/38 |
| 5,603,043 A | * | 2/1997 | Taylor et al. .................. 712/1 |
| 5,852,818 A | * | 12/1998 | Guay et al. .................... 707/1 |
| 5,898,693 A | * | 4/1999 | Vecchi et al. ................ 370/446 |
| 5,986,467 A | * | 11/1999 | Trimberger ................... 326/40 |
| 5,999,990 A | * | 12/1999 | Sharrit et al. .................. 710/8 |
| 6,020,758 A | * | 2/2000 | Patel et al. .................... 326/40 |
| 6,230,200 B1 | * | 5/2001 | Forecast et al. ............ 709/226 |
| 6,255,849 B1 | * | 7/2001 | Mohan ........................ 326/41 |
| 6,298,370 B1 | * | 10/2001 | Tang et al. .................. 709/102 |
| 6,351,143 B1 | * | 2/2002 | Guccione et al. ............. 326/40 |
| 6,353,331 B1 | * | 3/2002 | Shimanek ..................... 326/39 |
| 6,353,332 B1 | * | 3/2002 | Brelet .......................... 326/40 |
| 6,415,384 B1 | * | 7/2002 | Dave .......................... 713/100 |
| 6,442,732 B1 | * | 8/2002 | Abramovici et al. ........... 716/4 |
| 6,457,008 B1 | * | 9/2002 | Rhee et al. .................. 707/10 |
| 6,480,954 B2 | * | 11/2002 | Trimberger et al. ........... 713/1 |
| 6,487,709 B1 | * | 11/2002 | Keller et al. ................. 716/14 |
| 6,510,546 B1 | * | 1/2003 | Blodget ....................... 716/16 |
| 6,640,105 B1 | * | 10/2003 | Shin .......................... 455/453 |
| 6,671,724 B1 | * | 12/2003 | Pandya et al. .............. 709/226 |
| 6,678,646 B1 | * | 1/2004 | McConnell et al. .......... 703/22 |
| 2001/0047509 A1 | * | 11/2001 | Mason et al. |
| 2002/0091722 A1 | * | 7/2002 | Gupta et al. |
| 2002/0133583 A1 | * | 9/2002 | Fee et al. .................... 709/223 |
| 2002/0156914 A1 | * | 10/2002 | Lo et al. ..................... 709/238 |
| 2002/0156998 A1 | * | 10/2002 | Casselman .................. 712/227 |
| 2002/0157066 A1 | * | 10/2002 | Marshal et al. |
| 2002/0165960 A1 | * | 11/2002 | Chan |
| 2003/0041312 A1 | * | 2/2003 | Fueki |
| 2003/0046396 A1 | * | 3/2003 | Richter et al. |
| 2004/0049759 A1 | * | 3/2004 | Osann et al. ................. 716/16 |

* cited by examiner

Primary Examiner—Meng-Al T. An
Assistant Examiner—Lilian Vo
(74) Attorney, Agent, or Firm—LaRoy D. Maunu; Lois D. Cartier; Justin Liu

(57) ABSTRACT

A system and method for allocating resources of programmable logic devices (PLDs) according to activity level. In various embodiments, the activity levels of functions implemented on the PLDs are monitored. When decreasing and/or increasing activity levels are detected, the PLD resources are reallocated between the various functions in proportion to the decreasing and/or increasing activity levels.

11 Claims, 5 Drawing Sheets

SYSTEM AND METHOD FOR RUNTIME REALLOCATION OF PLD RESOURCES

FIELD OF THE INVENTION

The present invention generally relates to runtime reconfigurable systems, and more particularly to runtime reallocation of PLD resources in response to changing activity levels.

BACKGROUND

The field of reconfigurable computing has advanced steadily for the past decade, using programmable logic devices (PLDs) as the basis for high-performance reconfigurable systems. Run-Time Reconfigurable (RTR) systems distinguish themselves by performing circuit logic customization at run-time. RTR systems using PLDs are expected to result in systems that require less hardware, less software, and fewer input/output resources than traditional ASIC or PLD-based systems.

In multiprocessor data processing systems, various systems are known for balancing the work load between the processors. An advantage to such systems is that the functions implemented by the system can be software controlled, thereby providing great flexibility. However, such systems tend to be large, expensive, and complex. Furthermore, software-implemented functions tend to be slower than hardware implementations.

A system and method that address the aforementioned problems, as well as other related problems, are therefore desirable.

SUMMARY OF THE INVENTION

A system and method for allocating resources of programmable logic devices (PLDs) according to the activity levels of the functions implemented on the PLDs are provided. A load monitor surveys the activity levels of the functions implemented on the PLDs. When decreasing and/or increasing activity levels are detected, the PLD resources are reallocated between the various functions in proportion to the decreasing and/or increasing activity levels.

In another embodiment, a reserve of PLD resources is maintained. When the activity level of one or more functions is increasing and none of the other functions have decreasing activity levels, some portion of the reserve is allocated to the functions having increasing activity levels.

Various other embodiments are set forth in the Detailed Description and claims which follow.

DETAILED DESCRIPTION

In various embodiments, the invention monitors the activity level of various functions that are implemented on one or more PLDs. When the activity level of a function has decreased, a determination is made as to whether PLD resources of the function should be reprogrammed for another function. If so, the PLD resources are reprogrammed accordingly.

Figure 1:
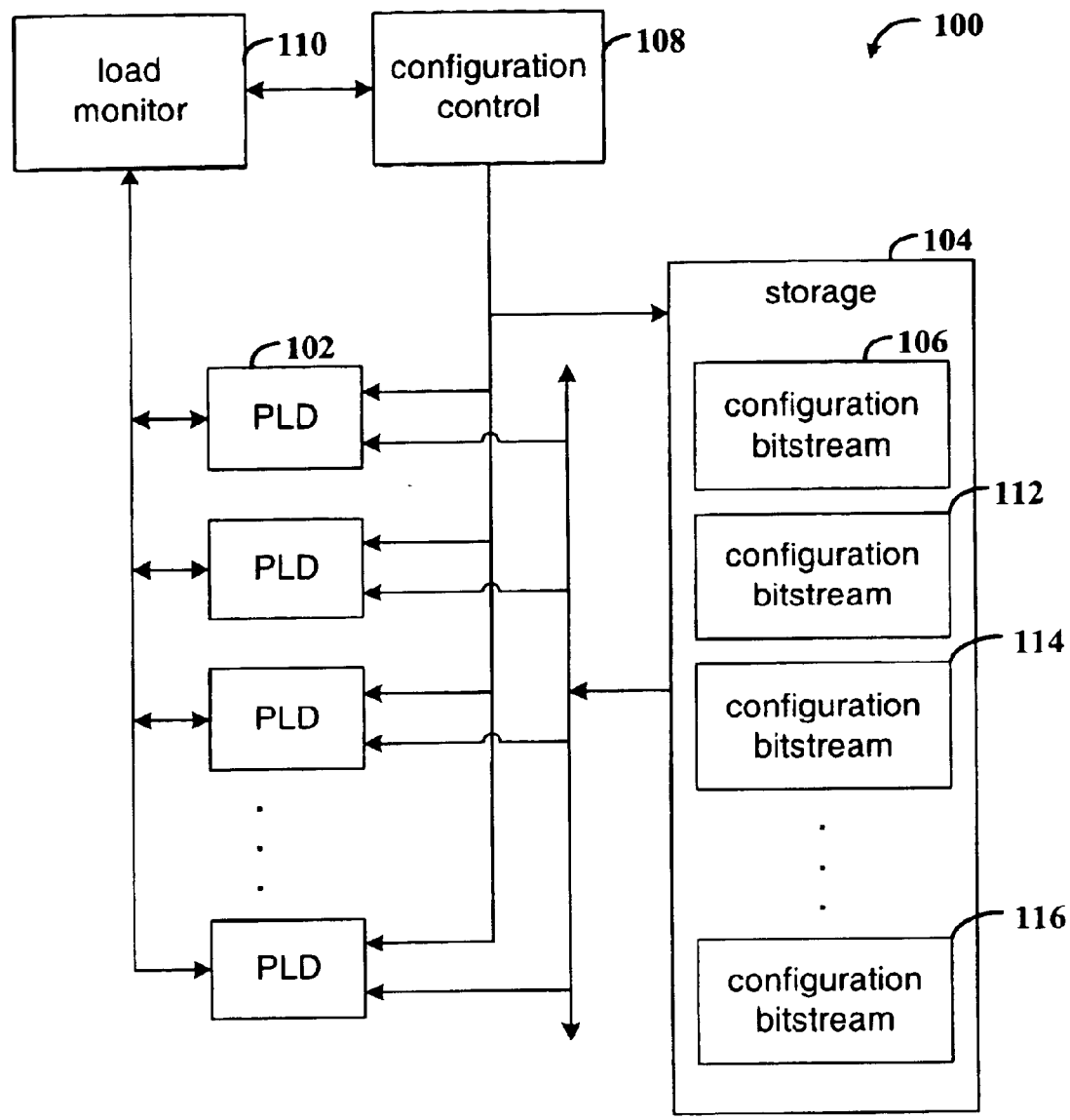
FIG. 1 is a functional block diagram of a system 100 having control logic for reconfiguration of PLD resources and load monitoring of different functions that are implemented on one or more PLDs, in accordance with one embodiment of the invention.

FIG. 1 is a functional block diagram of a system 100 having control logic for reconfiguration of PLD resources and load monitoring of different functions that are implemented on one or more PLDs, in accordance with one embodiment of the invention. The system includes one or more PLDs 102 that implement different functions, a storage element 104 for storing one or more configuration bitstreams 106 that program the PLD(s) to implement the functions, a configuration control element 108, and a load monitor 110.

The invention is applicable to systems having any of a variety of PLDs, for example FPGAs or CPLDs, where the particular function and the resources available on the PLD will determine the number of PLDs required. Partial reconfigurability of the PLD will also influence the number PLDs in the system. For example, the Virtex FPGA from Xilinx supports partial reconfiguration. Therefore, multiple functions may be implemented on a Virtex FPGA, depending on the resource requirements of the different functions. If it is determined that FPGA resources should be taken from one function and devoted to another function, the FPGA can be partially reconfigured for the reallocation of resources.

The different functions are implemented with associated configuration bitstreams. For example, configuration bitstream 106 implements a first function, configuration bitstream 112 implements a second function, configuration bitstream 114 implements a third function, and configuration bitstream 116 implements an nth function.

In one embodiment, storage 104 for the configuration bitstreams may include one or more in-system memory elements. In another embodiment, the configuration bitstreams may be stored outside the system on network storage, for example. Those skilled in the art will recognize other suitable storage alternatives for different application requirements.

Load monitor 110 is coupled to the PLDs for monitoring the activity level of the functions. For example, the PLDs may implement a plurality of communications channels, wherein different ones of the channels are dedicated to different protocols. If the traffic on the channels implementing a first protocol has decreased and the traffic on the channels implementing a second protocol has increased, some of the channels for the first protocol may be reallocated for the second protocol. The load monitor not only detects the need for reprogramming but also determines which PLD resources should be reprogrammed. Load monitor 110 also signals the functions implemented on the PLDs when a reconfiguration is to occur so that work-in-process can be finished or reassigned.

The mechanism by which load monitor 110 monitors the activity levels of the different functions can be adapted in accordance with the requirements of the application. For example, the functions may be designed with a feature for reporting the activity levels via an output port of the PLDs. Alternatively, registers internal to the PLDs and readable by the load monitor may be used for storing the current activity levels.

In order to reconfigure PLD resources, load monitor 110 must track which functions are implemented on which PLD resources. Furthermore, if the different functions require different types and numbers of PLD resources, those too must be tracked by the load monitor.

Configuration control element 108 is coupled to load monitor 110, storage 104, and to the PLDs 102. When reprogramming is requested by the load monitor, configuration control 108 signals the selected PLD(s) and initiates transfer of the selected configuration bitstream(s) from storage 104 to the appropriate PLD(s). It will be appreciated that the logic of load monitor 110 and configuration control element 108 could be integrated into a single device in another embodiment. The particular distribution of functionality between load monitor 110 and configuration control element 108, as well as the particular communication links to PLDs 102, can be tailored for specific application requirements.

Figure 2:
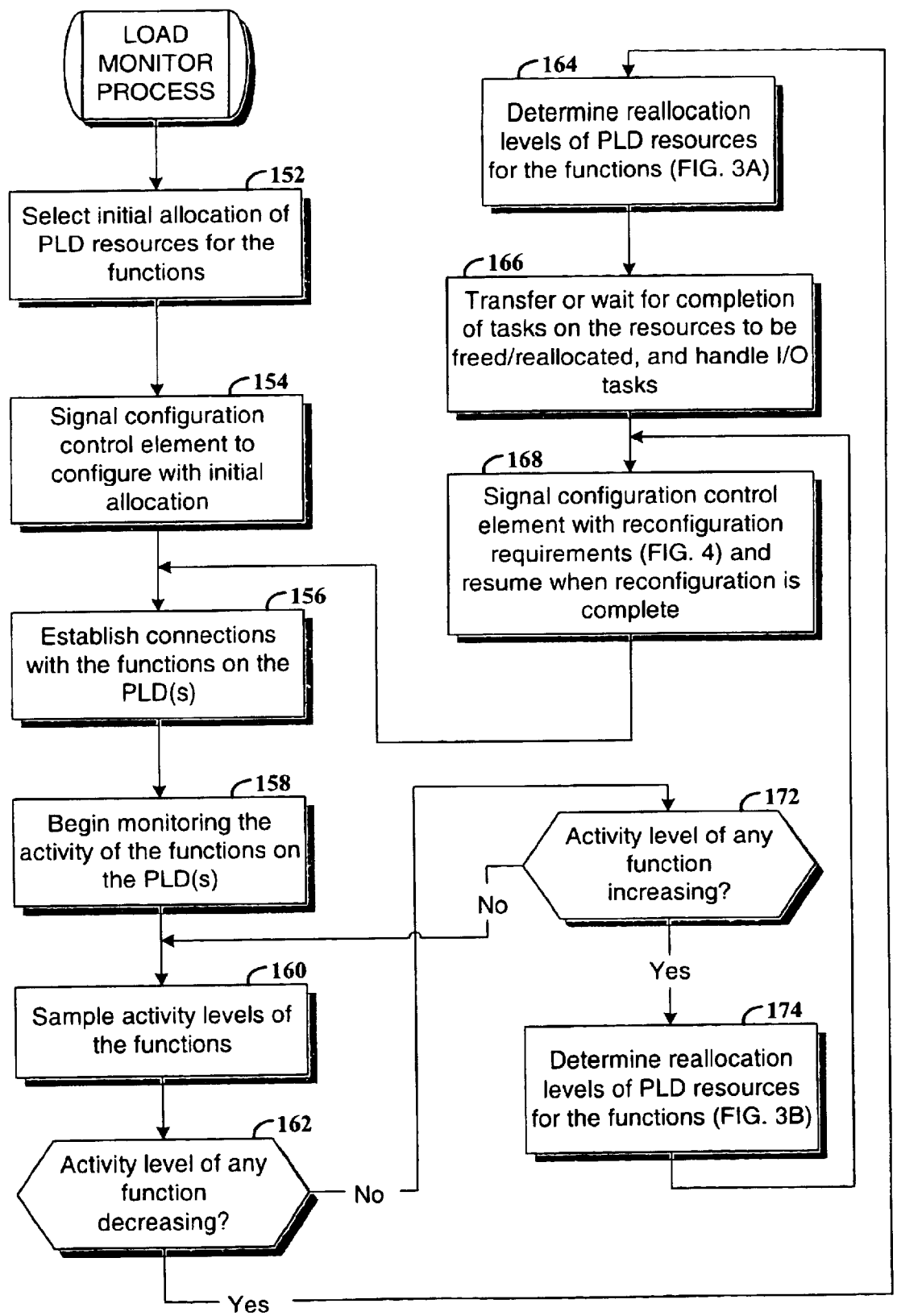
FIG. 2 is a flowchart of a process for monitoring the activity level of the functions implemented on the PLD(s).

FIG. 2 is a flowchart of a process for monitoring the activity level of the functions implemented on the PLD(s). The process generally entails performing an initial allocation of PLD resources between the functions and an initial configuration of the PLDs and then monitoring activity levels of the functions and reconfiguring the PLDs as necessary.

At step 152, an initial allocation of PLD resources is selected for the various functions. For example, in an application such as a communications switch, certain numbers of channels may be dedicated to different communications protocols. Thirty-two channels may be dedicated to protocol A, 64 channels may be dedicated to each of protocols B and C, and so on. Thus, the load monitor determines the number of channels to devote to each of the protocols.

Each channel maps to a set of PLD resources. In one embodiment, not all resources are initially allocated. For example, 10% of the total channels are not allocated to any protocol and are held as a reserve of resources for peak activity levels. At step 154, the configuration control is signaled to begin the initial configuration. The load monitor provides the configuration control with information identifying which PLD resources are to be configured with which configuration bitstreams. The manner in which PLD resources and configuration bitstreams are identified will depend on the specific functions and the capabilities of the particular PLD. Furthermore, if a single PLD supports more than one function, then a number of configuration bitstreams may be required to cover the possible combinations for allocating resources of the PLD between the different functions.

Once the PLDs have been configured and the system is operational, at step 156, the load monitor establishes communications with the functions on the PLDs. At step 158, the load monitor begins monitoring the activity levels of the functions. The load monitor samples (step 160) the activity levels every t interval of time for each function. A typical measure of activity level for a communications protocol channel is the number of packets processed per second. If a protocol is supported across multiple channels, the activity level is the total activity across all the channels implementing the protocol.

Decision step 162 tests whether the activity level of any of the functions is decreasing. When a function shows a decreasing activity level over n samples and the overall decrease is greater than a given threshold, some of the resources allocated to the function are freed for reallocation to other applications. The value of n and the threshold level are chosen so that reallocation is not performed in response to random and instantaneous changes. Each function may have a different threshold that varies based on the number of resources allocated to the function since functions having greater numbers of resources will be able to accommodate greater activity levels. In various embodiments, the functions implemented on the PLDs are programmed to periodically report activity levels to the load monitor either via an on-board PLD register or by transmission to the load monitor.

Figure 3A:
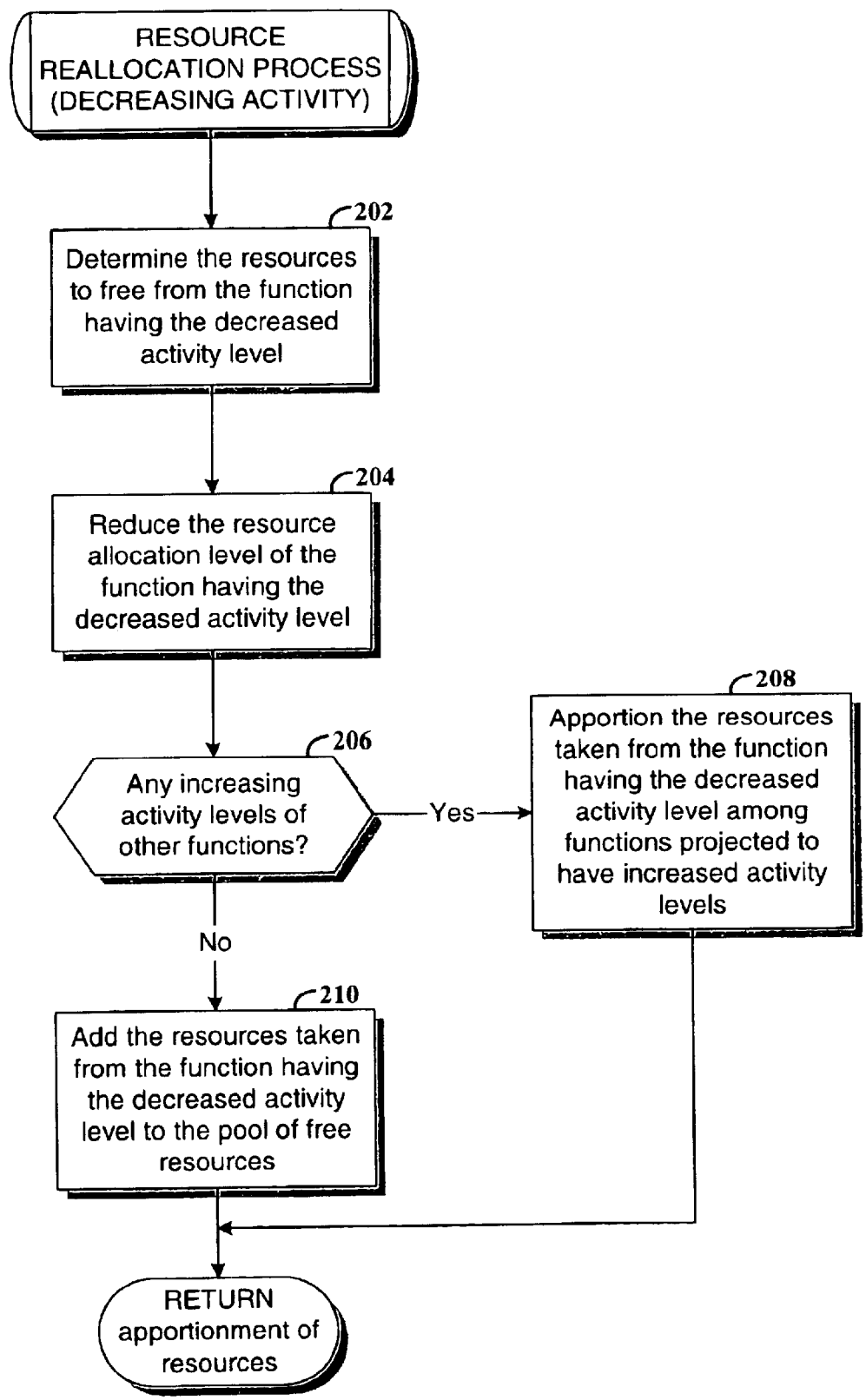
FIG. 3A is a flowchart of a process for determining the levels at which PLD resources should be reallocated between a number of functions when it is detected that the activity level for one of the functions is decreasing.

Step 164 determines how resources are to be reallocated between the functions implemented on the PLDs (FIG. 3A describes how the reallocated resource levels are determined for decreasing activity levels). At step 166, the load monitor signals the PLD(s) that will be reconfigured to complete work-in-process prior to reconfiguration. The work may be completed by virtue of finishing the work or transferring the work to a different resource (e.g., another PLD that will not be reconfigured). For I/O tasks on resources to be freed, a number of steps are performed:

1. The output ports from the resources to be freed are connected to output ports of another resource that implements the same function. For example, if channels A and B both implement protocol 1 and the resources from channel A are to be freed, the output ports of channel A are connected to unassigned output ports of channel B, or if time-slicing is used, to outputs of channel B having unused capacity.
2. Direct input data from the resource to be freed to another resource that implements the same function.

For example, (continuing the example of step 1) the input data directed at channel A is redirected to the input ports of channel B.

3. Disable the output ports of the resource to be freed.
4. Disable the input ports of the resource to be freed.

The connection and redirection of inputs and outputs can best be facilitated by either special I/O circuitry (for example, a crossbar switch), or a PLD reconfigured to re-map input and output connections.

At step 168, the configuration control element is signaled to begin the reconfiguration. The PLD resources that are reconfigured are those identified at step 164.

If decision step 162 finds that none of the functions have decreasing activity levels, the process is directed to decision step 172 to test whether any of the functions have increasing activity levels. If there are no functions having decreasing or increasing activity levels, the process returns to sampling the activity levels at step 160.

If any of the functions are detected as having increased activity levels, the process is directed to step 174. When a function shows an increasing activity level over n samples and the overall increase is greater than a given threshold, resources from the reserve a allocated to the function(s). The values of n and the threshold level are chosen so that reallocation is not performed in response to random and instantaneous changes. The thresholds associated with increasing activity levels may be different from the thresholds associated with decreasing activity levels, and each function may have a different threshold that varies based on the number of resources allocated to the function since functions having greater numbers of resources will be able to accommodate greater activity levels.

Figure 3B:
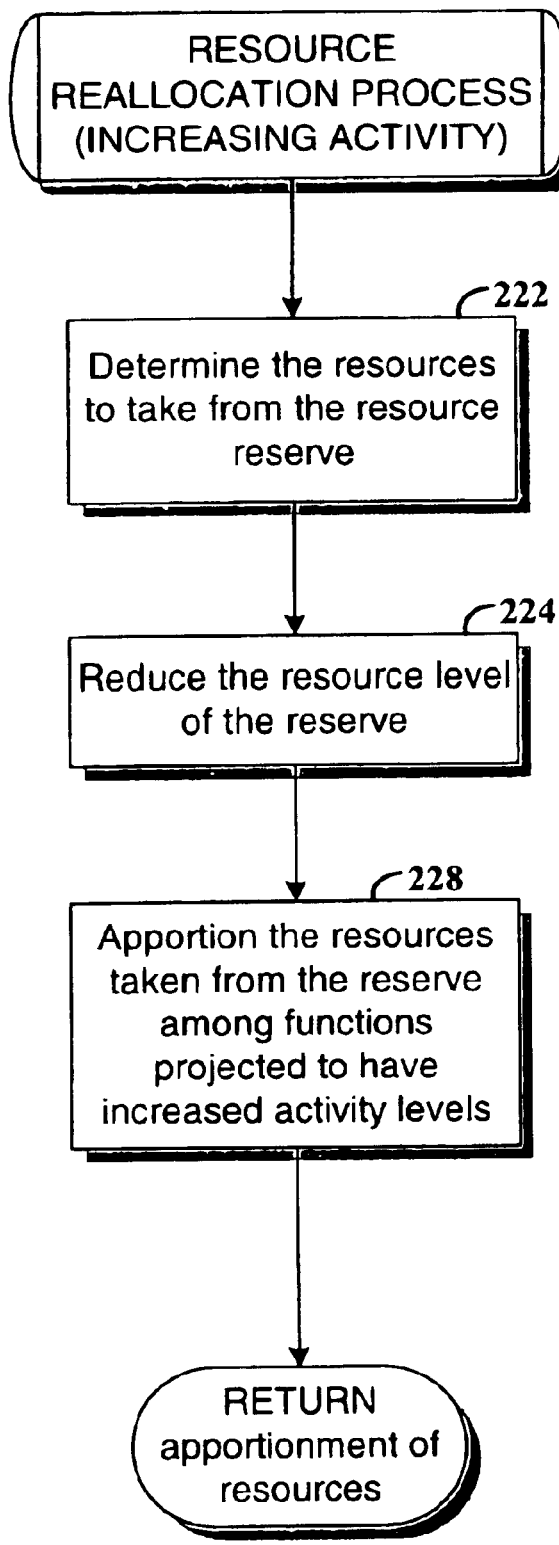
FIG. 3B is a flowchart of a process for determining the levels at which PLD resources should be allocated from the reserve of resources when the activity level of a function is increasing.

At step 174, it is determined how resources from the reserve are to be allocated to the function(s) (FIG. 3B describes how the reallocated resource levels are determined for increasing activity levels). The process then continues at step 168 as described above.

FIG. 3A is a flowchart of a process for determining the levels at which PLD resources should be reallocated between a number of functions when the activity level of a function is decreasing. The number of resources to free from a function is determined at step 202 and is based on the following model. Each resource can service a maximum load of $R_L$ for its given function. Thus, if M resources are assigned to a function, then the maximum sustainable activity level is $M^*R_L$. If the load monitor determines that the activity level has decreased such that a current activity level=$(M-P)^*R_L(P<=M)$, then the (P−1) resources are freed (one is left in reserve with the function). At step 204, the number of resources of the function is reduced by the amount determined at step 202. For example, the number of channels that implement a particular protocol is reduced.

Decision step 206 determines whether the freed resources should be allocated to other functions or held in reserve. The decision is made based on a projection of future activity levels of the other functions. The projection can be linear, least squares, or another technique that best models the overall system behavior. In one embodiment, the projection is made based on past behavior. Sample activity levels are taken by the load monitor. The values associated with the activity levels are stored over a sufficiently long window of time. The length of the window is based on the usage environment. Past performance is modeled statistically to predict future behavior. If the predicted future behavior is either a decrease or increase in the activity level, then reconfiguration and re-assignment may be initiated.

At step 208, the allocation of freed resources to functions is determined based on the projected, proportional needs of the functions. For example, if the activity level of a first function is projected to increase by 30% and the activity level of a second function is projected to increase by 10%, then the ratio of the projected increases is used when making the allocation. Assuming both the first and second functions begin with the same initial resource allocation, then the first function will be allocated three-fourths of the resources and the second function is allocated one-fourth of the resources.

If none of the activity levels is increasing, decision step 206 directs control to step 210, and the freed resources are added to the reserve of free resources. Parameters that describe the resources to allocate to the different functions are then returned to the process of FIG. 2.

FIG. 3B is a flowchart of a process for determining the levels at which PLD resources should be allocated from the reserve when the activity level of a function is increasing. At step 222, the number of resources to remove from the reserve and allocate to the one or more functions is determined.

The allocation of resources takes into account the increasing needs of the entire system (i.e., across multiple functions). The allocation process also ensures that the entire reserve is not depleted so that future increased activity levels can be handled. In one embodiment, the following model is used to manage the reserve of resources:

1. The load monitor tracks the total percentage of resources allocated to each function and the percentage of resources presently in the reserve. The total of all allocated resources is 100% ($R_1+R_2+R_3+R_4+...+R_{RESERVE}$=100%, where $R_x$ is the percent resources allocated to function X).
2. The load monitor tracks the predicted increase (or decrease) of resources for each function. Each predicted increase (or decrease) is represented as a percentage of the current resources allocated to a function.

When allocating from the reserve, a percentage of the reserve is maintained for future allocations. The portion of the reserve maintained for future allocations can be established as a fixed percentage or a sliding percentage that varies as a function of the activity levels of all the functions, for example, a smaller percentage when the functions are more active and a larger percentage when the functions are less active. The resources in the reserve will slowly decline to zero as the system reaches its saturation capacity. When the reserve is empty, only decreases in the activity levels of functions can trigger reallocations.

Resources are proportionally allocated from the reserve based on the projected increased activity levels of the functions. In addition, functions having the greatest projected increase are considered first. For example, if function A's activity level is projected to increase 30%, function B's 20%, function C's 10%, and 50 units of the reserve are eligible to allocate, then function A should maximally get 25 units (½*50 units), function B should maximally get 17 units (⅓*50), and function C should maximally get 8 units (⅙*50).

After the maximum allocations have been established, the allocations and assignment priority are evaluated against the actual predicted unit increase. For example, if function A is projected to have a 30% increase but currently has 10 resource units, then an allocation of 3 units rather than 25 would suffice. Thus, function A is allocated the 3 units and the difference is left in the reserve and eligible for allocation. This allows allocation to function B to be as much as needed.

The proportional allocation is then redone as between functions B and C using the eligible 47 units (50−3). Since function B's projected increase was 20% and function C's projected increase was 10%, function B may be proportionally allocated 32 units (~(⅔*47)), and function C may be allocated 15 units (47−32). However, if function B is currently allocated 400 units, then a 20% projected increase implies that an additional 80 units may be required (20%*400). However our rule allows only 32 to be allocated. We note however that more were actually requested and that as many as an additional (80−32) or 48 could be used. If C is currently allocated 10 units, then a projected 10% increase implies the allocation of 1 unit (10%*10). This means that now (47−32−1) or 14 units remain.

If any of the functions were allocated fewer resources than called for by the projection of increased activity level (for example, function B) and not all of the eligible resources were allocated in the first pass, then the process described above is repeated for those functions having projected activity levels that exceed the resources allocated in the first pass. In the present example only function B has an outstanding request for 48 units, and 14 units remain eligible for allocation. Thus, the 14 units are allocated to function B, leaving a deficiency of 34 units (80−(32+14)).

It will be appreciated that the inability to allocate sufficient resources to meet the projected need may or may not impact performance levels of the functions. If the projected increased activity levels are not reached, there is no impact on performance levels of the functions. If the projections were accurate and a function was not allocated all the resources necessary to meet the projections, then the performance level of the functions may be impaired.

After the selected resources of the PLD have been reconfigured in accordance with the selected allocation of resources, the load monitor continues to sample activity.

At step 224, the number of resources maintained in the reserve is reduced by the amount determined at step 222. For example, the number of channels that implement a particular protocol is reduced.

At step 228, the allocation of resources removed from the reserve amongst one or more functions is determined based on the projected, proportional activity levels of the functions. The projected activity levels and proportional allocation are determined as described above in association with FIG. 3A. Parameters that describe the resources to allocate to the different functions are then returned to the process of FIG. 2.

Figure 4:
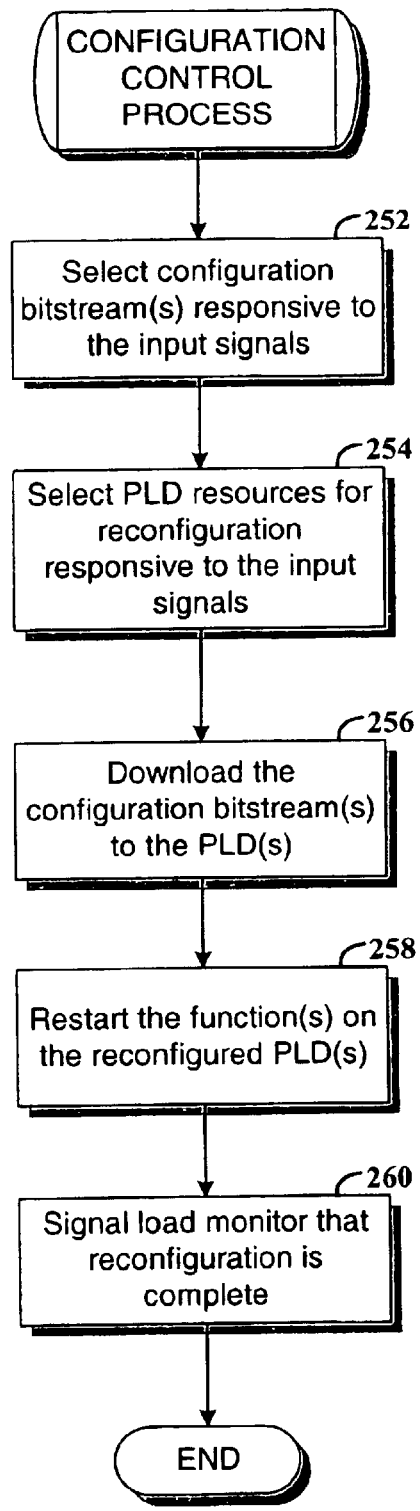
FIG. 4 is a flowchart of a process for controlling reconfiguration of PLDs in response to control parameters from the load monitor.

FIG. 4 is a flowchart of a process for controlling reconfiguration of PLDs in response to control parameters from the load monitor.

At step 252, one or more configuration bitstreams are selected in response to the signals from the load monitor. The particular configuration bitstreams that are selected will depend on the PLD resources to be reconfigured and the selected functions.

At step 254, the PLD resources that are to be reconfigured are selected.

The selected configuration bitstreams are then downloaded to the PLDs at step 256.

At step 258, the reconfigured PLDs are restarted with the reprogrammed functions.

Finally, at step 260 the load monitor is signaled that the reconfiguration is complete.

The present invention is believed to be applicable to a variety of systems having a plurality of PLD-implemented functions. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for allocating resources of one or more programmable logic devices (PLDs) to a plurality of functions in a system having one or more PLDs on which the functions are implemented, comprising:
    monitoring respective activity levels of the functions;
    detecting when the activity level of a first function is decreasing;
    selecting a subset of PLD resources that implement the first function;
    selecting a configuration bitstream for implementing a second function;
    reconfiguring the subset of PLD resources implementing the first function with the configuration bitstream of the second function;
    wherein the subset of PLD resources implementing the first function is reconfigured with the configuration bitstream of the second function only if the activity level of the second function is increasing; and
    if none of the functions have increasing activity levels, then reconfiguring the subset of PLD resources with a predetermined configuration bitstream and adding the subset of PLD resources to a reserve of PLD resources.

2. The method of claim 1, further comprising periodically sampling the activity levels of the functions.

3. The method of claim 2, further comprising determining whether the activity level of the first function is decreasing after the step of sampling the activity levels of the functions a selected number of times.

4. The method of claim 1, further comprising:
    detecting when the activity levels of the second and a third function are increasing;
    allocating the subset of PLD resources between the second and third functions in proportion to a ratio of increasing activity levels between the second and third functions;
    selecting a configuration bitstream for implementing the third function, wherein the configuration bitstreams for implementing the second and third functions proportionally allocate the subset of PLD resources in proportion to the ratio of increasing activity levels; and
    reconfiguring the subset of PLD resources with the configuration bitstreams of the second and third function.

5. The method of claim 1, further comprising, if none of the functions have decreasing activity levels, then detecting whether any of the functions have increasing activity levels, and for functions having increasing activity levels, allocating a subset of PLD resources from the reserve of PLD resources to the functions having increasing activity levels and reconfiguring the subset of PLD resources from the reserve of PLD resources with configuration bitstreams that implement the functions having increasing activity levels.

6. The method of claim 5, wherein the configuration bitstreams for implementing the functions having increasing activity levels proportionally allocate the subset of PLD resources from the reserve in proportion to a ratio of increasing activity levels.

7. An apparatus for allocating resources of one or more programmable logic devices (PLDs) to a plurality of functions in a system having one or more PLDs on which the functions are implemented, comprising:
    means for monitoring respective activity levels of the functions;
    means for detecting when the activity level of a first function is decreasing;
    means for selecting a subset of PLD resources that implement the first function;
    means for selecting a configuration bitstream for implementing a second function; and
    means for reconfiguring the subset of PLD resources implementing the first function with the configuration bitstream of the second function only if the activity level of the second function is increasing; and
    means for reconfiguring the subset of PLD resources with a predetermined configuration bitstream and adding the subset of PLD resources to a reserve of PLD resources if none of the functions have increasing activity levels.

8. A method for allocating resources of one or more programmable logic devices (PLDs) to a plurality of functions in a system having one or more PLDs on which the functions are implemented, comprising:
    monitoring activity levels of the functions;
    selectively reconfiguring selected resources of the PLDs in response to changes in the activity levels of the functions;
    in response to none of the functions having increasing activity levels and at least one of the functions having a decreasing activity level, selecting a subset of PLD resources that implement the at least one function and reserving the subset of resources for allocation to a second function when an activity level of the second function is increasing;
    allocating a subset of PLD resources between functions in proportion to a ratio of increasing activity levels between the functions;
    selecting one or more configuration bitstreams that proportionally allocate the subset of PLD resources in proportion to the ratio of increasing activity levels; and
    reconfiguring the subset of PLD resources with the one or more configuration bitstreams.

9. The method of claim 8, further comprising periodically sampling the activity levels of the functions.

10. The method of claim 9, further comprising determining whether the activity level of a function is decreasing after the step of sampling the activity levels of the functions a selected number of times.

11. A method for allocating resources of at least one programmable logic devices (PLD), comprising:

monitoring respective activity levels of a plurality of functions implemented on at least one PLD;

detecting when the activity level of a first function of the plurality of functions is decreasing and the activity level of a second function of the plurality of functions is increasing;

selecting, in response to the decreasing activity level of the first function and the increasing activity level of the second function, a subset of PLD resources that implement the first function and a configuration bitstream for implementing a second function;

reconfiguring the subset of PLD resources implementing the first function with the configuration bitstream of the second function in response to an increasing activity level of the second function; and in response to none of the plurality of functions having increasing activity levels and at least one of the functions having a decreasing activity level, reconfiguring the subset of PLD resources that implement the first function with a configuration bitstream that implements a function other than the function in the monitored activity levels of the plurality of functions, and maintaining the subset of PLD resources as a reserve of PLD resources available for subsequent configuration to implement a function of the plurality of functions having an increasing activity level.

* * * * *